May 24, 1938.  C. M. BAECHLE  2,118,064
COMBINED ENCLOSURE AND DETACHABLE MEMBER
Filed Jan. 28, 1937  2 Sheets-Sheet 1

INVENTOR.
CLAIRE M. BAECHLE
BY
ATTORNEY.

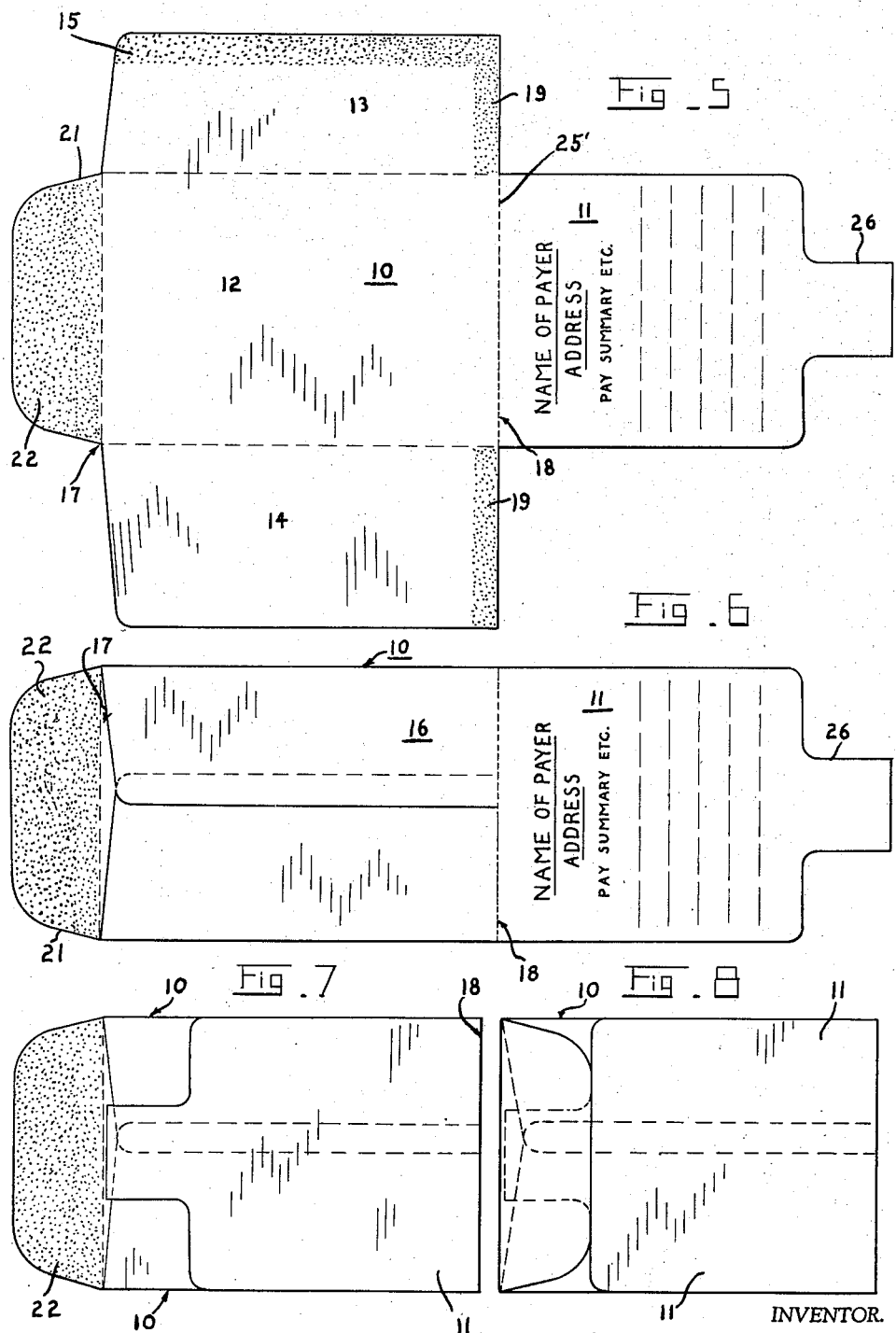

Patented May 24, 1938

2,118,064

UNITED STATES PATENT OFFICE 2,118,064

COMBINED ENCLOSURE AND DETACHABLE MEMBER

Claire M. Baechle, Baltimore, Md., assignor to The Glenn L. Martin Company, Baltimore, Md.

Application January 28, 1937, Serial No. 122,746

4 Claims. (Cl. 283—1)

This invention relates to a combined enclosure and detachable member and more particularly, but not necessarily, to a pay envelope having a detachable confidential data sheet connected therewith.

In transmitting valuables, such as money, from an employer to an employee covering compensation for services rendered and the like, it is not only necessary that such valuables be transferred in a manner as will indicate whether or not such valuables have been tampered with, but which will convey to the recipient such necessary explanation regarding the valuables as may be desired and to do so in such a manner that the information will be maintained in the utmost secrecy.

Such laws as the Social Security Act have presented a new problem to concerns having a large number of employees. This law requires that a certain percentage of salaries earned be deducted from each employee's compensation, and it is necessary that such deductions be properly indicated to these employees at the time such salaries or wages are paid. It is also advisable and desired by most concerns that information regarding salaries or wages be maintained confidentially between the employer and the employee.

Further, employers are called upon to make other deductions from the earnings of the employees, such as donations to charitable organizations, installments on stock purchases, benefits, and the like.

It is highly important that all transactions affecting employee's salaries be indicated in such a manner as to enable each employee to maintain a correct record of these various transactions in order that proper income tax and other reports may be made. It is equally important that this information be transferred to these employees in a simple understandable manner and in such form as will enable them to maintain the proper record regarding these several transactions.

It is one object of this invention to provide a novel combined enclosure and information sheet.

Another object is to provide a novel pay envelope and record sheet that shall convey compensation from one person or source to another together with explanatory data relating to such compensation and that shall convey such compensation and data sheet in a safe and confidential manner.

Another object is to provide a novel pay envelope and data sheet having the above characteristics wherein the said data sheet may be readily separated from the envelope and filed for future record purposes.

Another object is to provide an improved pay envelope including a detachable data sheet that shall indicate compensation and data relating to such compensation from one person or source to another in a safe confidential manner and that shall provide the recipient with a permanent record of the transaction.

Another object is to provide a pay envelope and record sheet having the above characteristics that can be formed from a single sheet of material and thereby provide an integrally formed envelope and record sheet that shall prevent the separation of the two due to inadvertency, accident, or mistake.

A further object is to provide a combined pay envelope and the like and a detachable data or information sheet having novel means for closing the envelope that shall conceal the information contained on the data sheet so long as the envelope is closed.

A still further object is to provide a combined enclosure and detachable member having the above characteristics that shall be simple, rugged, efficient in operation, and comparatively cheap to manufacture.

The above and other objects will be made apparent throughout the further description of the invention when taken in connection with the accompanying drawings, wherein like reference characters refer to like parts. It is to be distinctly understood that the drawings are not a definition of the invention but merely illustrate certain forms by means of which the invention may be effectuated. The invention will be defined by the appended claims.

In the drawings:

Figure 1 is a plan view of one form of a blank from which the present invention may be constructed.

Figure 2 is a view similar to Figure 1 showing the envelope or enclosure portion in folded position.

Figure 3 is a view similar to Figure 2 having the detachable confidential sheet folded to overlie the envelope portion of the present device.

Figure 4 is a bottom plan view of Figure 3 showing the envelope closing means in closed position.

Figure 5 is a view similar to Figure 1 illustrating another embodiment of the invention.

Figures 6 and 7 are views similar to Figures 2 and 3 illustrating like positions of the embodiment shown by Figure 5, and Figure 8 is a view similar to Figure 7 having the envelope sealing or closing means in closed position.

Referring to the drawings, Figures 1 to 4, inclusive, illustrate one embodiment of the invention wherein 10 indicates the enclosure or envelope in its entirety and 11 indicates an integral detachable data or record sheet.

The enclosure 10 comprises a back portion 12 and a front portion 16 consisting of lapped portions 13 and 14. In forming the enclosure 10, the lapped portions 13 and 14 are folded in overlapping relation, as clearly shown by Figure 2. One or the other of the outer edges of the lapped portions 13 and 14 are provided with an adhesive or sealing means indicated at 15 for sealing the lapped portions 13 and 14 in assembled relation and providing a front of the enclosure indicated in its entirety by 16.

The enclosure may be referred to as having an open end 17 and a closed end 18 and novel means for closing these ends. In this embodiment an adhesive or connecting means indicated at 19 is provided on the record sheet adjacent its inner or attached end so that when the record sheet 11 is folded to overlie the envelope and conceal the data contained thereon, the bottom 18 of the enclosure may be sealed closed, while the outer or free end of the record or data sheet 11 is provided with a tab 21 containing a sealing means 22 for sealing or closing the open end 17 of the enclosure or envelope.

It can now be understood that upon folding the member 11 to overlie the front 16 of the enclosure that the tab 21 may be folded over the open end 17 of the envelope and sealed to close the open end.

An important feature of the invention resides in the construction of the envelope to form an extension 23 of the front portion 16 of the envelope 10 in order that the tab 21 may not only seal the corresponding surface of the back 12 of the envelope, but will also seal the inner surface 24 of the extension 23 of the front 16 of the envelope. This provides a positive and efficient means for closing the opening 17 of the envelope.

The detachable member 11 is preferably perforated along the line 25 whereby the record portion 11 may be easily detached from the envelope and retained by the recipient, while the envelope may be discarded in its entirety.

Also it is clearly disclosed by Figure 3 that the name of the employee or addressee together with such other necessary identification information is disclosed on the back of the detachable member 11, which information is sufficient to indicate the recipient's name and related date. This information being located on the detachable member 11 will, of necessity, be filed with the record contained on the inner face of the detachable member 11. This permits the discarding of the entire envelope with freedom as it is void of any information regarding the recipient or the information conveyed to the recipient.

It can now be readily understood that in order to close the open end 17 of the enclosure 10 that it will be necessary to fold the detachable member 11 over and into superimposed relation on the front 16 of the enclosure 10 and in so doing the data on the detachable sheet 11 being positioned on the corresponding side or surface of the detachable member 11 to that which the sealing means 22 is positioned on the tab 21 will operate automatically and positively to conceal the information contained on the detachable member 11.

Figures 5 to 8, inclusive, illustrate another embodiment of the invention, wherein the tab 21 is carried by the open end 17 of the enclosure and formed integrally with the back 12 so that when the detachable member 11 is folded into concealing position, the tab 21 will operate to seal a reduced portion 26 formed at the outer or free end of the detachable member 11.

The tab 21 contains a sealing means 22 which will not only adhere to the corresponding portion of the front 16 of the enclosure, but will also seal the adjacent surface of the reduced portion 26 of the member 11. In this embodiment the member 11, which is also formed integrally with the enclosure 10 is here shown as an extension of the enclosure back 12 in the same manner as that described in connection with Figures 1 to 4, inclusive. The means 19 for closing the closed end 18 of the envelope is carried by, or disposed on, the cooperating ends of the members 13 and 14, forming the front 16 of the enclosure. In this embodiment the detachable member 11 may be perforated along the line 25' for detaching it from the enclosure 10.

In the embodiment illustrated in Figures 1-4, inclusive, it will be noted that the means 19 and 22 for closing the closed and open ends, respectively, of the envelope are carried by the member 11 and that the member 11 is perforated along line 25, whereby the entire member 11 may be detached from the envelope except that portion carrying the sealing or connecting means 19. In the embodiment shown in Figures 5-8, inclusive, the means for closing both the open and closed ends of the envelope or enclosure are carried by the enclosure, while the detachable member 11 is detachable along the line 25' from the bottom 18 of the envelope 10.

The two embodiments of the invention here illustrated and described are sufficient to teach a person skilled in the art the novel features of the invention and it is to be understood that certain changes, modifications, substitutions, additions, and omissions may be made in the forms here illustrated and described without departing from the spirit and scope of the invention.

I claim:

1. A new article of manufacture, an enclosure having an open end, a closed end, a sheet detachably mounted to the said closed end, the said detachably mounted sheet having a free end, the latter adapted to fold over the open end of the said enclosure for closing the said open end.

2. A new article of manufacture, a pay envelope having an open end, a sheet detachably mounted to said envelope, the said sheet having a free end, the said free end being provided with an adhesive substance and adapted to fold over and close the said open end of the said envelope.

3. A new article of manufacture, an enclosure comprising a back portion, a front portion, an open end, and a closed end, one of the said portions terminating short of the other said portion at one of the said ends and a sheet detachably mounted to the other of the said ends, the said sheet having a free end, and means associated with the said free end for connecting the adjacent surfaces of the said portions at the said end where one of the said portions terminates short of the other said portion.

4. A combined envelope and sheet comprising an envelope having an opened end and a closed end, a sheet detachably mounted to the said envelope adjacent the said closed end, the said sheet having a free end and sealing means carried by the said free end for simultaneously concealing one side of the said sheet in sealed relation with the said envelope and closing the said open end of the said envelope.

CLAIRE M. BAECHLE.